US007637991B2

(12) United States Patent
Eddington et al.

(10) Patent No.: US 7,637,991 B2
(45) Date of Patent: Dec. 29, 2009

(54) CYCLONIC SEPARATING APPARATUS

(75) Inventors: Robin Eddington, Norfolk (GB); Ricardo Gomiciaga-Pereda, Wiltshire (GB)

(73) Assignee: Dyson Technology Limited, Wiltshire (GB)

( * ) Notice: Subject to any disclaimer, the term of this patent is extended or adjusted under 35 U.S.C. 154(b) by 334 days.

(21) Appl. No.: 11/596,320

(22) PCT Filed: Apr. 20, 2005

(86) PCT No.: PCT/GB2005/001513

§ 371 (c)(1),
(2), (4) Date: Nov. 13, 2006

(87) PCT Pub. No.: WO2005/110608

PCT Pub. Date: Nov. 24, 2005

(65) Prior Publication Data

US 2007/0175189 A1 Aug. 2, 2007

(30) Foreign Application Priority Data

May 12, 2004 (GB) ................................ 0410526.8

(51) Int. Cl.
*B01D 51/00* (2006.01)
*B01D 45/12* (2006.01)

(52) U.S. Cl. ............................ 96/385; 55/345; 55/414; 55/459.1; 55/DIG. 3; 55/DIG. 21; 15/353

(58) Field of Classification Search .................. 96/380, 96/384, 385; 55/413, 414, 416, 459.1, DIG. 3, 55/DIG. 21; 181/231, 264; 15/350, 353
See application file for complete search history.

(56) References Cited

U.S. PATENT DOCUMENTS

| | | | | |
|---|---|---|---|---|
| 4,162,904 | A * | 7/1979 | Clay et al. | 96/381 |
| 5,466,372 | A * | 11/1995 | Jerabek et al. | 210/512.1 |
| 6,344,064 | B1 * | 2/2002 | Conrad | 55/337 |
| 6,425,931 | B1 | 7/2002 | Croggon | |
| 6,968,596 | B2 * | 11/2005 | Oh et al. | 15/353 |
| 7,065,826 | B1 * | 6/2006 | Arnold | 15/353 |

FOREIGN PATENT DOCUMENTS

| | | | |
|---|---|---|---|
| EP | 0616853 | A1 | 9/1994 |
| JP | 56-64761 | | 10/1979 |
| JP | 2002-509792 | | 4/2002 |
| WO | WO-99/49978 | | 10/1999 |
| WO | WO-2004/108861 | A1 | 12/2004 |
| WO | WO-2005/016108 | A1 | 2/2005 |

* cited by examiner

*Primary Examiner*—Duane Smith
*Assistant Examiner*—Sonji Turner
(74) *Attorney, Agent, or Firm*—Morrison & Foerster LLP

(57) ABSTRACT

A cyclonic separating apparatus includes a separating chamber, an inlet communicating with the separating chamber and an outlet formed by a conduit communicating with an interior portion of the separating chamber and having a longitudinal axis, wherein a single planar baffle projects radially inwardly from an interior surface of the conduit towards the longitudinal axis. The presence of the baffle in the outlet has the effect of reducing noise generated by the apparatus when in use and also improves pressure recovery.

25 Claims, 5 Drawing Sheets

CYCLONIC SEPARATING APPARATUS

REFERENCE TO RELATED APPLICATIONS

This application is a national stage application under 35 USC 371 of International Application No. PCT/GB2005/001513, filed Apr. 20, 2005, which claims the priority of United Kingdom Application No. 0410526.8, filed May 12, 2004, the contents of both of which prior applications are incorporated herein by reference.

FIELD OF THE INVENTION

The invention relates to cyclonic separating apparatus. Cyclonic separating apparatus is known to be used to separate materials from one another, those materials commonly being in different phases (eg, solids from gases, solids from liquids, or liquids from gases), although it is perfectly possible to use such apparatus to separate denser gases or liquids from lighter gases or liquids. Cyclonic separating apparatus is also known to be used to good effect in vacuum cleaners, where solid matter (dirt, dust and debris) is separated from an airflow and retained in the vacuum cleaner prior to disposal whilst the cleaned air is expelled into the atmosphere. The present invention is particularly, although not exclusively, suitable for use in vacuum cleaners.

BACKGROUND OF THE INVENTION

One of the problems known to be associated with vacuum cleaners is that of noise. It is also perceived that a vacuum cleaner having a higher measure of "airwatts" (which is related to the amount of suction developed by the cleaner at the inlet thereof) will perform better than a vacuum cleaner having a lower measure of airwatts. In relation to the latter, it is well understood that minimising friction losses and pressure drops within the cleaner will result in a maximised measure of airwatts.

In general, the outlets of cyclonic separating apparatus are normally formed by cylindrical tubes, also known as vortex finders. The prior art shows that it is known to recover pressure in cyclonic separating apparatus by providing symmetrical arrangements of blades or vanes in the outlets thereof such that the spiralling airflow is straightened. See, for example, U.S. Pat. No. 2,771,157. The blades or vanes are commonly shaped so that the upstream end is curved into a generally helical shape. However, these arrangements do not address the problem of noise in vacuum cleaners and other apparatus.

It is an object of the invention to provide cyclonic separating apparatus which, when in use, is comparatively quiet and also, when used in a vacuum cleaner, provides the vacuum cleaner with a comparatively high measure of airwatts. It is a further object of the invention to provide a simplified and economical way of achieving these improvements.

The invention provides cyclonic separating apparatus having a separating chamber, an inlet communicating with the separating chamber and an outlet, the outlet being formed by a conduit communicating with the interior of the separating chamber and having a longitudinal axis, wherein a single, planar baffle projects radially inwardly from an interior surface of the conduit towards the longitudinal axis.

The provision of a single baffle within the conduit has been shown to reduce the pressure drop across the cyclone separator in comparison to a cyclone separator without such a baffle. The baffle is simple and easy to manufacture integrally with the vortex finder if desired.

The reasons why the observed benefits, particularly in relation to noise, are achieved by the provision of the baffle are not fully understood. It is thought possible that the presence of the baffle may interfere with the precession of internal vortices around the conduit as the airflow passes out of the apparatus, thus reducing the amount of noise generated by these vortices. However, it may transpire that other explanations will be discovered at a later date.

Preferably, the baffle projects across at least one quarter, more preferably across substantially one third, of the diameter of the conduit. It is preferred that the baffle extends along at least one quarter of the length of the conduit, more preferably along at least half of the length of the conduit and still more preferably along substantially the entire length of the conduit. Testing has shown that these arrangements produce good results.

In a preferred embodiment, the upstream end of the baffle lies adjacent the upstream end of the conduit. This is because the effectiveness of the baffle in relation to noise reduction is greatest if the baffle lies towards the upstream end of the conduit.

The upstream and downstream ends of the baffle are also preferably curved or tapered so that the risk of fluff or threads being caught on the baffle is minimised.

In a further preferred embodiment, the baffle is provided in combination with at least one longitudinally-extending groove formed in the interior surface of the conduit. This combination maximises the noise reduction achievable.

BRIEF DESCRIPTION OF THE DRAWINGS

Embodiments of the invention will now be described with reference to the accompanying drawings in which.

DETAILED DESCRIPTION OF THE INVENTION

Figure 1:
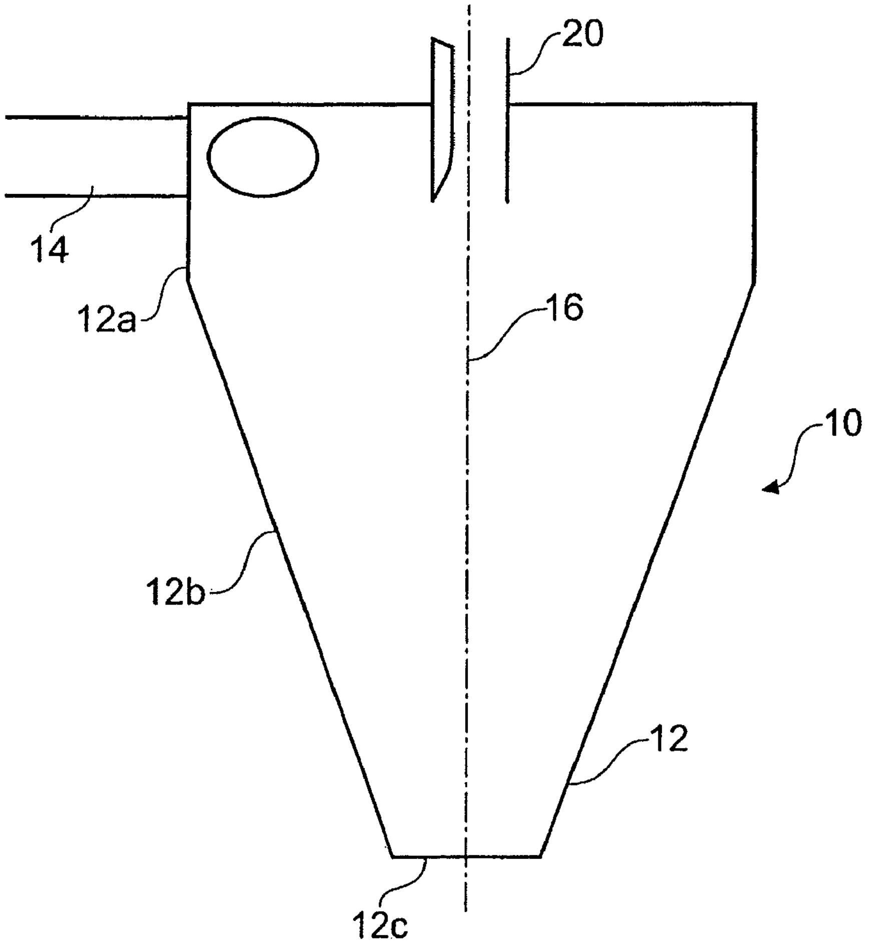
FIG. 1 is a schematic side view of cyclonic separating apparatus according to the present invention.

Cyclonic separating apparatus according to the invention is shown schematically in FIG. 1. The apparatus 10 generally comprises a cyclone body 12 having an inlet 14 and an outlet or vortex finder 20. The cyclone body 12 is illustrated here as having an upper cylindrical portion 12*a* and a lower frusto-conical portion 12*b* which tapers away from the cylindrical portion 12*a*. The frusto-conical portion 12*b* terminates in a cone opening 12*c* which communicates with a collector (not shown). However, it will be appreciated that cyclone bodies can equally be wholly cylindrical, wholly tapering or even outwardly tapering. Further, the length of the tapering portion in comparison to the cylindrical portion may be varied from that illustrated in FIG. 1, as may the angle of taper. The precise shape of the cyclone body 12 is not material to the present invention.

The inlet 14 is here illustrated as lying generally tangentially to the cyclone body 12. However, alternative inlet arrangements can be provided. All that is necessary is that the incoming fluid is caused to move in the cyclone body 12 in a swirling manner by means of which a vortex is formed therein. The tangential inlet 14 could be replaced by a radial or axial inlet together with further means for causing the necessary swirl, such as, for example, helical vanes (not shown). The inlet 14 is formed as a simple pipe and communicates with the interior of the cyclone body 12 at the upper end thereof. The vortex finder 20 is also formed generally as a simple tube and forms a conduit, although further details of the design of the vortex finder 20 will be explained below. The vortex finder 20 is positioned centrally of the cyclone body 12, also at its upper end, ie. at the same end as the inlet 14.

The operation of cyclonic separation apparatus 10 of the type described above is well understood. A fluid having material entrained therein (in the case of vacuum cleaners, this is an airflow having dirt, dust and debris entrained therein) enters the cyclone body 12 via the inlet 14. The arrangement of the inlet 14 is such that the fluid whirls around the interior of the cyclone body 12, thus forming a vortex therein. The matter entrained within the fluid flow is separated from the fluid and falls to the lower end of the cyclone body 12 where it exits the cyclone body 12 via the cone opening 12*c* and falls into the collector (not shown). If no cone opening or collector is provided, the separated matter may collect inside the cyclone body 12 at the lower end thereof.

Meanwhile, the fluid from which the matter has been separated passes inwardly towards the longitudinal axis 16 of the cyclone body 12 and exits the apparatus 10 via the vortex finder 20. The fluid is still spinning at very high angular velocities as it exits the apparatus 10 and a significant amount of noise is created as the spinning fluid passes through the vortex finder 20.

Figure 2:
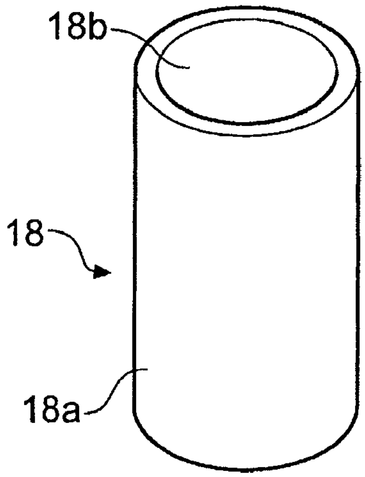
Fig. 2 Prior Art
FIG. 2 is a perspective view of a vortex finder according to the prior art.

For comparison purposes, a known prior art vortex finder 18 is illustrated in FIG. 2. The known vortex finder 18 has a hollow cylindrical shape and has smooth outer and inner walls 18*a*, 18*b*.

Figure 3:
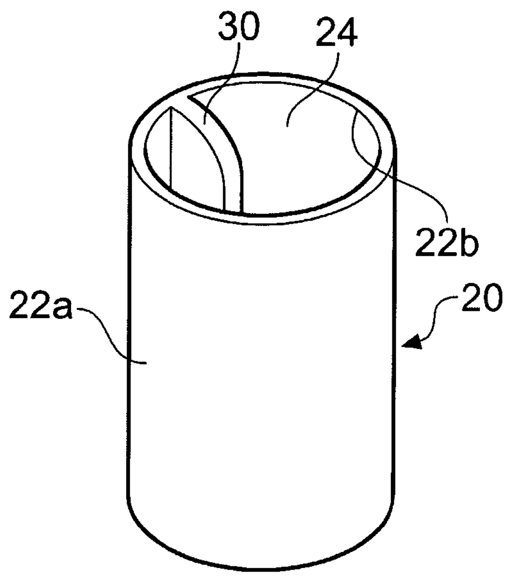
FIG. 3 is a perspective view of a vortex finder forming part of the cyclonic separating apparatus of FIG. 1.
Figure 4A:
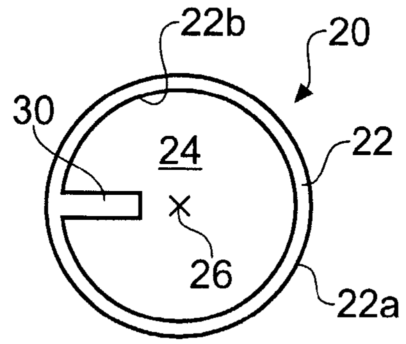
FIG. 4*a* is a lateral cross-section through the vortex finder of FIG. 3.
Figure 4B:
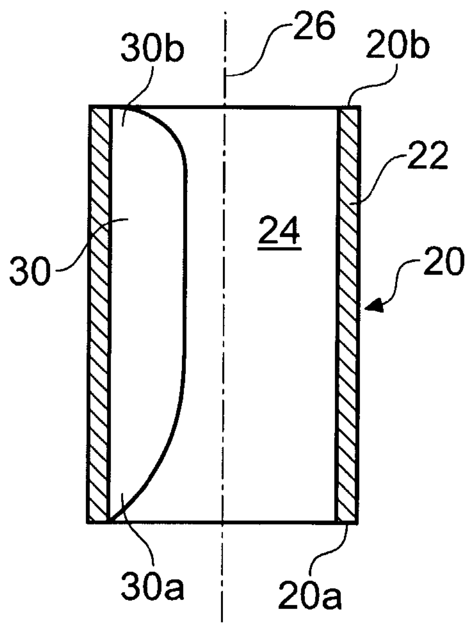
FIG. 4*b* is a longitudinal cross-section through the vortex finder of FIG. 3.

FIGS. 3, 4*a* and 4*b* show the vortex finder 20 of the apparatus shown in FIG. 1 in more detail. The vortex finder 20 is generally cylindrical in shape and is moulded from a plastics material to form a conduit 24 having a longitudinal axis 26. The cylindrical wall 22 has an outer surface 22*a* and an interior surface 22*b*. The interior surface 22*b* carries a single baffle 30 extending therefrom towards the longitudinal axis 26 of the conduit 24. The baffle 30 lies in a plane extending across a diameter of the conduit 24 as shown in FIG. 4*a*. The baffle 30 extends across substantially one third of the diameter of the conduit 24 and can be moulded integrally with the conduit 24.

As can be seen from FIG. 4*b*, the upstream and downstream ends 30*a*, 30*b* of the baffle 30 lie adjacent the upstream and downstream ends 20*a*, 20*b* of the vortex finder 20. The total length of the baffle 30 is thus the same as the length of the vortex finder 20. However, the upstream end 30*a* is shaped so as to increase in depth in the direction of flow through the conduit 24 and so has an outwardly tapered shape at the upstream end 30*a* thereof. This shape helps to discourage large, lightweight pieces of debris (such as fibres and fluff) from becoming lodged on the upstream end 30*a* of the baffle 30 and potentially causing a blockage. The downstream end 30*b* is also shaped so as to decrease in depth in the direction of flow and has a curved or arcuate shape as shown in FIG. 4*b*. This shape helps to avoid turbulence within the airflow exiting the vortex finder 20.

The vortex finder 20 illustrated in FIGS. 3, 4*a* and 4*b* is used in the apparatus 10 to provide improved separation apparatus capable of separating dirt and dust from an airflow. The presence of the baffle 30 in the vortex finder 20 avoids the generation of excessive noise as the airflow exits the apparatus. Furthermore, the presence of the baffle 30 achieves this without significantly reducing the number of airwatts capable of being achieved by the apparatus 10.

Figure 5:
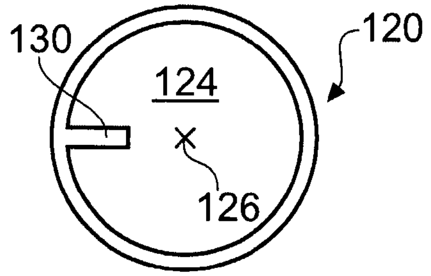
FIG. 5 is a lateral cross-section through a first alternative vortex finder, similar to that shown in FIG. 4*a;*

FIGS. 5, 6*a*, 6*b* and 6*c* illustrate alternative vortex finders suitable for use in cyclonic separating apparatus according to the invention. The vortex finder 120 illustrated in FIG. 5 is very similar to that shown in FIGS. 3, 4*a* and 4*b* except that the baffle 130 extends only approximately one quarter of the way across the diameter of the conduit 124 towards the longitudinal axis 126. Otherwise, the baffle 130 has the same shape as the baffle 30 shown in FIG. 4*b*, having an outwardly tapering upstream end and an arcuate downstream end, each end lying alongside the respective end of the conduit 124.

Figure 6A:
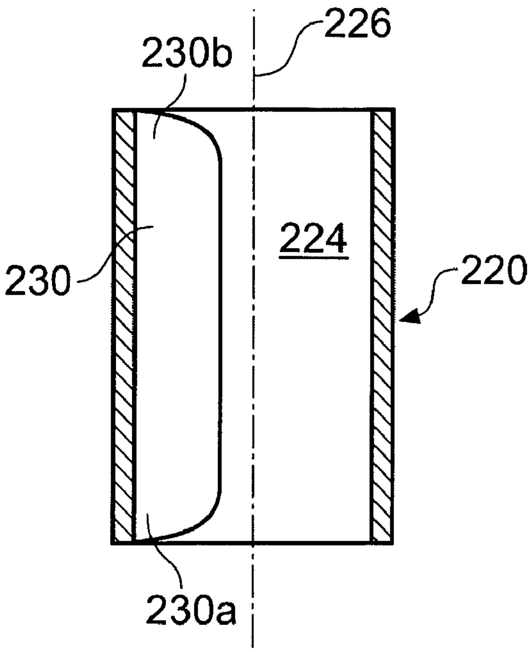
FIG. 6*a* is a longitudinal cross-section through a second alternative vortex finder, similar to that shown in FIG. 4*b;*

The vortex finder 220 illustrated in FIG. 6*a* differs from the vortex finder 120 illustrated in FIG. 4*b* only in the shape of the baffle 230. In the vortex finder 220 of FIG. 6*a*, the baffle 230 has an arcuate upstream end 230*a* which is similar in shape to the arcuate downstream end 230*b*. The baffle 230 extends across substantially one third of the conduit 224 towards the axis 226 and has a total length which is the same as that of the conduit 224.

Figure 6B:
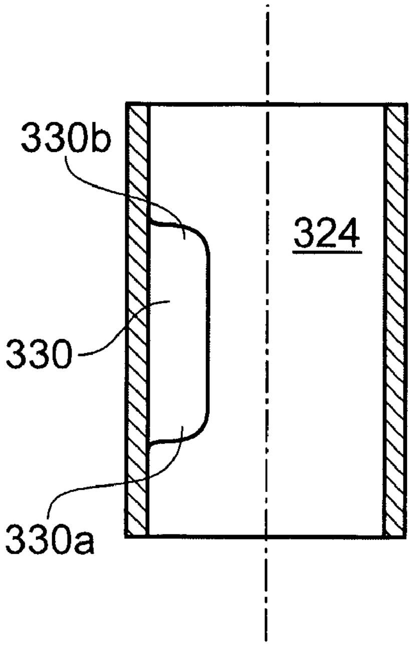
FIG. 6*b* is a longitudinal cross-section through a third alternative vortex finder, similar to that shown in FIG. 6*a;*

FIG. 6*b* shows a further variation in which the baffle 330 is similar in shape to the baffle 230 shown in FIG. 6*a*. However, the baffle 330 extends only approximately one quarter of the way cross the conduit 324. The total length of the baffle 330 is equal to approximately one half of the length of the conduit 324. Furthermore, the baffle 330 is positioned in the central section of the conduit 324, ie. the upstream and downstream ends 330*a*, 330*b* of the baffle 330 are substantially equidistant from the respective ends of the conduit 324.

Figure 6C:
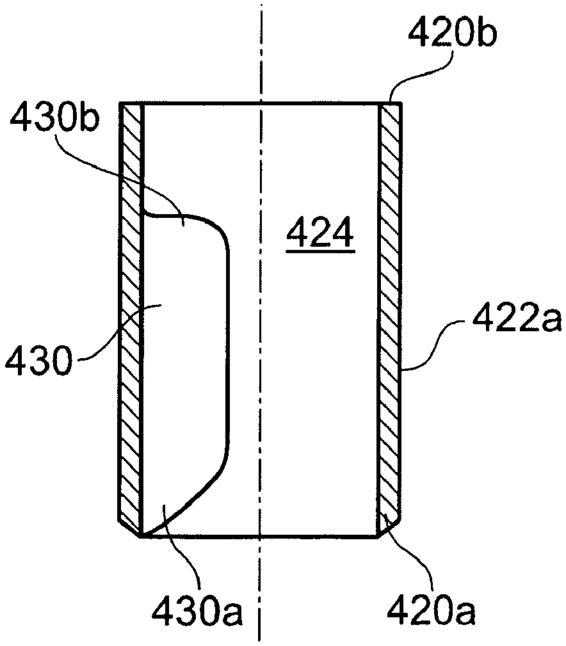
FIG. 6*c* is a longitudinal cross-section through a fourth alternative vortex finder, similar to that shown in FIG. 6*a;*

FIG. 6*c* illustrates a modification to the vortex finder 20 shown in FIGS. 4*a* and 4*b* in which the length of the baffle 430 is approximately three quarters of the length of the conduit 424. The upstream end 430*a* of the baffle 430 lies alongside the upstream end 420*a* of the vortex finder 420 and the downstream end 430*b* of the baffle 430 is spaced from the downstream end 420*b* of the vortex finder 420. Additionally, the upstream end 420*a* of the vortex finder 420 has a radius applied to the outer surface 422*a*. This modification can be applied to any of the previously described embodiments.

Figure 7A:
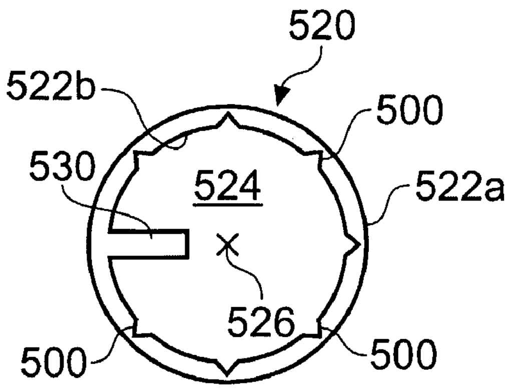
FIG. 7*a* is a lateral cross-section through a fifth alternative vortex finder, similar to that shown in FIG. 5.

FIG. 7*a* shows a further alternative vortex finder 520 which is similar to that shown in FIGS. 3, 4*a* and 4*b*. The vortex finder 520 differs from that shown in the previous drawings in that a plurality of grooves 500 are formed in the interior surface 522*b* of the cylindrical wall 522. The grooves 500 are triangular in shape and extend from the interior surface 522*b* towards the exterior surface 522*a*. In the embodiment shown, seven grooves 500 are provided and these are equispaced about the axis 526 on either side of the baffle 530. The baffle 530 is the same as that shown in FIG. 4*b*. The grooves 500 extend along the full length of the conduit 524. The combined effect of the baffle 530 and the grooves 500 is to minimise the noise generated by the apparatus in which the vortex finder 520 is used.

Figure 7B:
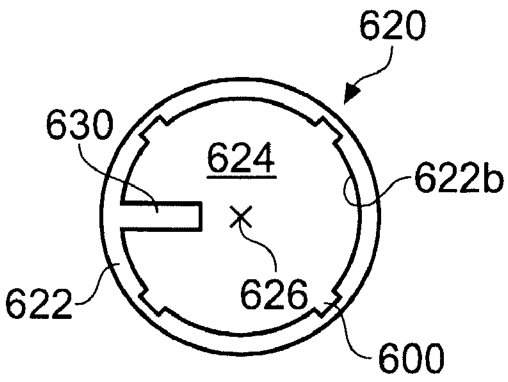
FIG. 7*b* is a lateral cross-section through a sixth alternative vortex finder, similar to that shown in FIG. 5.

A further variation is shown in FIG. 7*b* in which the vortex finder 620 includes a baffle 630 of the type shown in FIG. 4*b* (although the baffle could equally be of any of the types shown in the other Figures) and grooves 600 are provided in the interior surface 622*b* of the cylindrical wall 622. In this case, only four grooves 600 are provided and these are equi-spaced about the axis 624 with the baffle 630 located midway between two adjacent grooves 600. The grooves 600 are formed with a rectangular cross-section and extend along the full length of the conduit 624.

Figure 8:
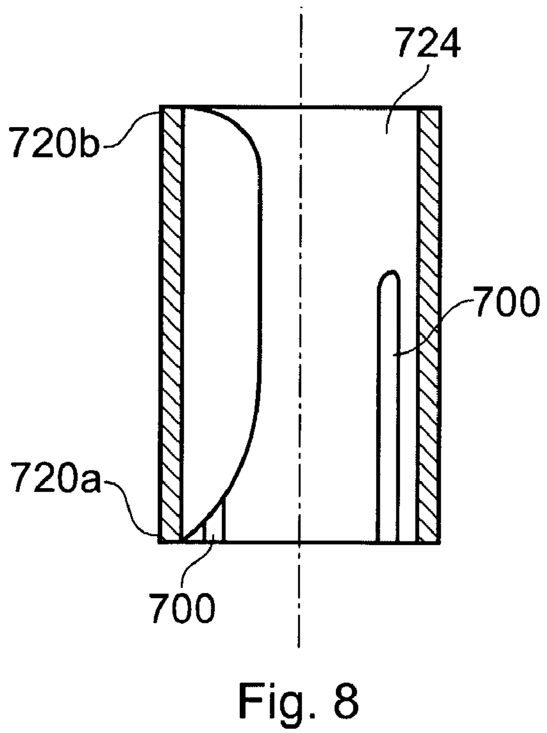
FIG. 8 is a longitudinal cross-section through a seventh alternative vortex finder, similar to that shown in FIG. 7*b*.

FIG. 8 shows a variation on the vortex finder shown in FIG. 7*b* in which the grooves 700 extend along only approximately two thirds of the conduit 724. The grooves 700 extend from the upstream end 720*a* of the vortex finder 720 and terminate at a distance from the downstream end 720*b* thereof.

Figure 9A:
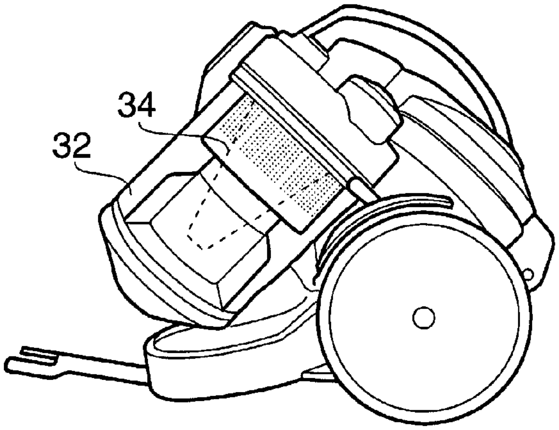
FIGS. 9*a*, 9*b* and 9*c* illustrate vacuum cleaners in which cyclonic separating apparatus according to the invention may be utilised.
Figure 9B:
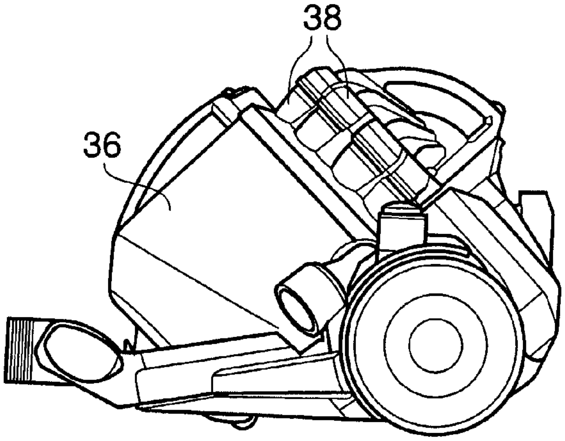
Figure 9C:
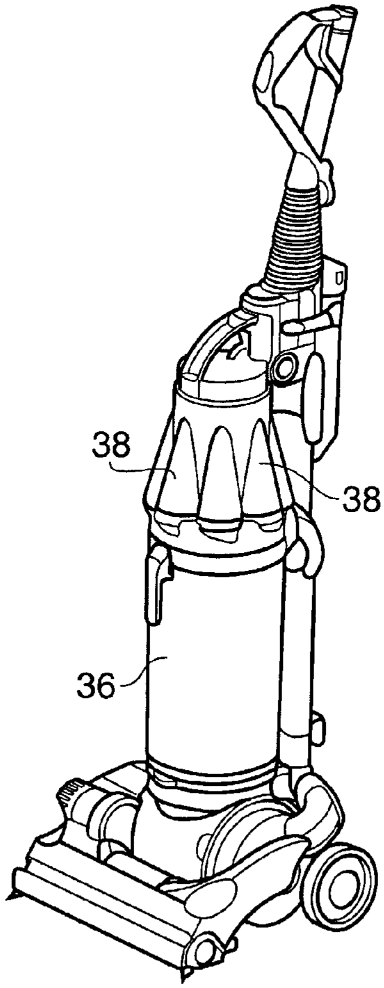

FIGS. 9*a*, 9*b* and 9*c* illustrate three different types of vacuum cleaner in which cyclonic separating apparatus according to the invention can advantageously be utilised. The cylinder vacuum cleaner shown in FIG. 9*a* incorporates two single cyclones 32, 34 arranged in series, one of which is located inside the other. It is envisaged that the invention would be utilised to its best advantage in relation to the interior cyclone 34. FIGS. 9*b* and 9*c* illustrate cylinder and upright vacuum cleaners respectively in each of which a single upstream cyclone 36 is followed by a plurality of downstream cyclones 38 arranged in parallel. The invention is expected to be of the greatest benefit when used in relation to some or all of the downstream cyclones 38.

It has been found that, by replacing the traditional, cylindrical vortex finder with a vortex finder having an internal baffle extending along at least part of its length, the noise generated by the cyclonic separating apparatus, at least when used in a vacuum cleaner, is reduced. Furthermore, the baffle appears to be able to achieve a significant amount of pressure recovery in the airflow as it exits the cyclonic separating apparatus. This has significant benefits to the consumer in that the airwatts achievable by the vacuum cleaner is increased, which in turn has a beneficial effect on the pickup performance of the cleaner.

The invention is not intended to be limited to the precise details of the embodiments shown in the accompanying drawings. Variations and modifications will be apparent to a skilled reader. For example, the length of the baffle need not be precisely as shown in the drawings and the tapering/arcuate shape of either end thereof can be varied. The number of grooves provided could be varied and their shape could also be other than rectangular or triangular.

The invention claimed is:

1. A cyclonic separating apparatus, comprising a separating chamber, an inlet communicating with the separating chamber and an outlet, the outlet being formed by a conduit communicating with an interior portion of the separating chamber and having a longitudinal axis, wherein a single planar baffle projects radially inwardly from an interior surface of the conduit towards the longitudinal axis to a depth of at most about one third of a diameter of the conduit.

2. The cyclonic separating apparatus as claimed in claim 1, wherein the baffle projects across at least one quarter of the diameter of the conduit.

3. The cyclonic separating apparatus as claimed in claim 2, wherein the baffle projects across substantially one third of the diameter of the conduit.

4. The cyclonic separating apparatus as claimed in any one of claims 1 to 3, wherein the baffle extends along at least one half of the length of the conduit.

5. The cyclonic separating apparatus as claimed in claim 4, wherein the baffle extends along at least three quarters of the length of the conduit.

6. The cyclonic separating apparatus as claimed in claim 5, wherein the length of the baffle is substantially the same as the length of the conduit.

7. The cyclonic separating apparatus as claimed in any one of claims 1 to 3, wherein an upstream end of the baffle lies adjacent an upstream end of the conduit.

8. The cyclonic separating apparatus as claimed in any one of claims 1 to 3, wherein an upstream end of the baffle increases in depth in a direction of flow through the conduit.

9. The cyclonic separating apparatus as claimed in claim 8, wherein the upstream end of the baffle tapers radially inwardly in the direction of flow through the conduit.

10. The cyclonic separating apparatus as claimed in any one of claims 1 to 3, wherein a downstream end of the baffle decreases in depth in a direction of flow through the conduit.

11. The cyclonic separating apparatus as claimed in claim 10, wherein the downstream end of the baffle is arcuate in shape.

12. The cyclonic separating apparatus as claimed in any one of claims 1 to 3, wherein at least one longitudinally-extending groove is formed in the interior surface of the conduit.

13. The cyclonic separating apparatus as claimed in claim 12, wherein the groove extends parallel to the baffle.

14. The cyclonic separating apparatus as claimed in claim 12, wherein the groove extends substantially along the entire length of the conduit.

15. The cyclonic separating apparatus as claimed in claim 12, wherein at least four grooves are formed in the interior surface of the conduit.

16. The cyclonic separating apparatus as claimed in claim 15, wherein at least six grooves are formed in the interior surface of the conduit.

17. The cyclonic separating apparatus as claimed in any one of claims 1 to 3, wherein the upstream end of the conduit has a rounded outer surface.

18. A vacuum cleaner comprising the cyclonic separating apparatus as claimed in any one of claims 1 to 3.

19. A vacuum cleaner comprising the cyclonic separating apparatus as claimed in claim 4.

20. A vacuum cleaner comprising the cyclonic separating apparatus as claimed in claim 7.

21. A vacuum cleaner comprising the cyclonic separating apparatus as claimed in claim 8.

22. A vacuum cleaner comprising the cyclonic separating apparatus as claimed in claim 10.

23. A vacuum cleaner comprising:

a first cyclonic separation chamber located along an airflow pathway; and a plurality of second cyclonic separation chambers arranged downstream from the first cyclonic separation chamber along the airflow pathway, the second cyclonic separation chambers being arranged in parallel with respect to the airflow pathway;

wherein at least one of the second cyclonic separation chambers is coupled to a conduit having a longitudinal axis, an inlet, an outlet, and a single planar baffle projecting radially inwardly from an interior surface of the conduit towards the longitudinal axis.

24. A cyclonic separating apparatus, comprising a separating chamber, an inlet communicating with the separating chamber and an outlet, the outlet being formed by a conduit communicating with an interior portion of the separating chamber and having a longitudinal axis, wherein a single planar baffle projects radially inwardly from an interior surface of the conduit towards the longitudinal axis;

wherein an upstream end of the baffle increases in depth in a direction of flow through the conduit.

25. A cyclonic separating apparatus, comprising a separating chamber, an inlet communicating with the separating chamber and an outlet, the outlet being formed by a conduit communicating with an interior portion of the separating chamber and having a longitudinal axis, wherein a single planar baffle projects radially inwardly from an interior surface of the conduit towards the longitudinal axis;

wherein a downstream end of the baffle decreases in depth in a direction of flow through the conduit.

* * * * *